United States Patent
Koberstein et al.

(10) Patent No.: US 10,183,549 B2
(45) Date of Patent: Jan. 22, 2019

(54) MODULATING VEHICLE HEATING AND COOLING SYSTEM AND CONTROL METHOD

(71) Applicant: FORD GLOBAL TECHNOLOGIES, LLC, Dearborn, MI (US)

(72) Inventors: Manfred Koberstein, Troy, MI (US); Angelo Patti, Pleasant Ridge, MI (US); Loren John Lohmeyer, III, Monroe, MI (US); Jing He, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 67 days.

(21) Appl. No.: 15/499,548

(22) Filed: Apr. 27, 2017

(65) Prior Publication Data

US 2018/0312034 A1    Nov. 1, 2018

(51) Int. Cl.
*B60H 1/00* (2006.01)
*B60H 3/02* (2006.01)

(52) U.S. Cl.
CPC ..... *B60H 1/00899* (2013.01); *B60H 1/00271* (2013.01); *B60H 1/00278* (2013.01); *B60H 1/00385* (2013.01); *B60H 3/024* (2013.01); *B60H 2001/00307* (2013.01);
(Continued)

(58) Field of Classification Search
CPC ............ B60H 1/00899; B60H 1/00385; B60H 1/00271; B60H 1/00278; B60H 1/323; B60H 3/024; B60H 2001/00307; B60H 2001/00935; B60H 2001/00942; B60H 2001/00928
See application file for complete search history.

(56) References Cited

U.S. PATENT DOCUMENTS

| 6,915,649 B2 | 7/2005 | Amaral et al. |
| 7,841,431 B2 | 11/2010 | Zhou |
| 2005/0061497 A1 | 3/2005 | Amaral et al. |

(Continued)

FOREIGN PATENT DOCUMENTS

| CN | 103612570 A | 3/2014 |
| EP | 1302731 A1 | 4/2003 |
| EP | 2923867 A1 | 9/2015 |

OTHER PUBLICATIONS

English machine translation of CN103612570A.
(Continued)

*Primary Examiner* — Emmanuel Duke
(74) *Attorney, Agent, or Firm* — Vichit Chea; King & Schickli, PLLC

(57) ABSTRACT

A vehicle having a heating and cooling system includes a refrigerant loop having first and second heat exchangers, a compressor, and an expansion device, and a coolant loop. The coolant loop is connected, in one embodiment, to allow a first flow of coolant to be directed through each of a plurality of heat exchangers and an auxiliary coolant loop and to allow a second flow of coolant to be directed through each of the plurality of heat exchangers and the auxiliary coolant loop dependent upon a mode of operation. A control module controls the first and second flows dependent upon the mode of operation. In one other embodiment, the coolant loop includes manifolds and reservoirs with regulating sending and receiving ports for directing the flows. The auxiliary coolant loop is for heating/cooling one or more components, such as a battery, dependent upon the mode of operation.

20 Claims, 10 Drawing Sheets

(52) U.S. Cl.
CPC .............. *B60H 2001/00928* (2013.01); *B60H 2001/00935* (2013.01); *B60H 2001/00942* (2013.01)

(56) References Cited

U.S. PATENT DOCUMENTS

2013/0283838 A1   10/2013  Kadle et al.
2016/0082805 A1    3/2016  Graaf et al.

OTHER PUBLICATIONS

English machine translation of EP1302731A1.
Jung, Matthias et al. "Holistic Thermal Management of Electric Vehicles" MAHLE Behr GmbH & Co. KG, TD1.1DT, May 17, 2016.

MODULATING VEHICLE HEATING AND COOLING SYSTEM AND CONTROL METHOD

TECHNICAL FIELD

This document relates generally to vehicle heating and cooling systems, and more specifically to a modulating heating and cooling system with an optional thermal management system.

BACKGROUND

Driven by direct and indirect legislations, electrification will be required for compliance in the future automotive world. For hybrid and electric vehicles, heat pump systems represent a proven solution to extend the driving range of electrified vehicles and hold significant potential in meeting the increasing demands on electrification. Compared to heating methods using high voltage positive temperature coefficient (HV-PTC) heaters or phase-change material (PCM) heat storage, for example, a heat pump system may extend the driving range by up to 30% (FTP drive cycle at −10 □C; supplier data).

The commonly used air-to-air heat pump systems demonstrate the highest energy efficiency. Such systems, however, involve sophisticated controls and increase costs due in part to the addition of refrigerant valves. Even more, there are certain potential safety risks associated with such systems that circulate refrigerant through cabin heat exchangers. In the event of an evaporator breach when the natural refrigerant R744 (carbon dioxide) is used, for example, such a breach could pose health threats to occupants due to elevated levels of $CO_2$ concentration in the passenger compartment.

Secondary loop heat pump systems, on the other hand, provide a relatively simple architecture that supports simpler controls and is cost effective. Overall, potential safety risks are minimized because no refrigerant is circulated through cabin heat exchangers. In addition, a secondary loop heat pump typically uses less refrigerant charge than a similar size air-to-air heat pump. This could represent a significant cost saving for R1234yf systems where the refrigerant itself is relatively expensive. While these systems overcome many of the noted issues associated with other systems, secondary loop systems are generally less efficient due primarily to heat transfers occurring indirectly between ambient air and passenger compartment air.

Given the noted and distinct advantages of secondary loop heat pump systems, a need exists for such a system that is capable of dynamic, adaptive control for improved energy efficiency. Such a system might may be sufficient to eliminate HV-PTC heaters for the passenger compartment and HV-PTC heaters for warming vehicle components (e.g., one or more batteries) making such systems a more competitive solution for use in vehicle climate control and thermal management.

SUMMARY OF THE INVENTION

In accordance with the purposes and benefits described herein, a vehicle having a heating, ventilation, and air conditioning (HVAC) system for heating and cooling a passenger compartment system is provided. The HVAC system may be broadly described as comprising a refrigerant loop having first and second refrigerant-to-coolant heat exchangers, a coolant loop having a first reservoir and a first manifold for directing a first flow of coolant through at least one of a plurality of air-to-coolant heat exchangers, and a second reservoir and a second manifold for directing a second flow of coolant through at least one other of the plurality of air-to-coolant heat exchangers dependent upon a mode of operation, and a control module for controlling the first and second coolant reservoirs and the first and second manifolds dependent upon the mode of operation.

In another possible embodiment, the plurality of air-to-coolant heat exchangers includes at least an outside heat exchanger, and first and second passenger compartment heat exchangers.

In another possible embodiment, each of the first and second reservoirs and manifolds include at least one sending port and at least one receiving port and the control module controls a degree of openness of the at least one sending port and the at least one receiving port.

In still another possible embodiment, the first flow of coolant is heated within the first refrigerant-to-coolant heat exchanger and directed through the first manifold, the outside heat exchanger, and the first reservoir for cooling the first flow of coolant, and the second flow of coolant is cooled within the second refrigerant-to-coolant heat exchanger and directed through the second manifold, the first passenger compartment heat exchanger, and the second reservoir for lowering a temperature within the passenger compartment in a cooling mode of operation.

In one other possible embodiment, the first flow of coolant is heated within the first refrigerant-to-coolant heat exchanger and directed through the first manifold, the second passenger compartment heat exchanger, and the first reservoir for raising a temperature within the passenger compartment, and the second flow of coolant is cooled within the second refrigerant-to-coolant heat exchanger and routed through the second manifold, the outside heat exchanger, and the second reservoir for heating the second flow of coolant in a heating mode of operation.

In yet still another possible embodiment, the first flow of coolant is heated within the first refrigerant-to-coolant heat exchanger and directed through the first manifold, the outside heat exchanger, the first passenger compartment heat exchanger, and the first reservoir for cooling the first flow of coolant and for warming the passenger compartment, and the second flow of coolant is cooled within the second refrigerant-to-coolant heat exchanger and directed through the second manifold, the second passenger compartment heat exchanger, and the second reservoir for cooling the passenger compartment in a dehumidification and reheat mode of operation.

In another possible embodiment, the first flow of coolant is heated within the first refrigerant-to-coolant heat exchanger and directed through the first manifold, an auxiliary coolant loop, and the first reservoir for heating a component.

In another possible embodiment, the second flow of coolant is cooled within the second refrigerant-to-coolant heat exchanger and directed through the second manifold, an auxiliary coolant loop, and the second reservoir for cooling a component.

In one other possible embodiment, a vehicle heating and cooling system includes a refrigerant loop having at least first and second refrigerant-to-coolant heat exchangers, a compressor, and an expansion device through which a refrigerant flows, a coolant loop connected to allow a first flow of coolant to be directed through at least one of a plurality of air-to-coolant heat exchangers, and to allow a second flow of coolant to be directed through the at least one of the plurality of air-to-coolant heat exchangers dependent upon a mode of operation, and a control module for controlling the first and second flows of coolant dependent upon the mode of operation.

In another possible embodiment, the refrigerant loop further includes at least one of an internal heat exchanger, a two-way valve, a three-way valve, an accumulator, and a second expansion device.

In yet another possible embodiment, the coolant loop includes a plurality of four-way valves for directing the first flow of coolant through at least one of the plurality of air-to-coolant heat exchangers, and the second flow of coolant through at least one other of the plurality of air-to-coolant heat exchangers dependent upon the mode of operation.

In still another possible embodiment, the control module further controls the plurality of four-way valves.

In one other possible embodiment, the first flow of coolant is heated within the first refrigerant-to-coolant heat exchanger and directed by the plurality of four-way valves through the outside heat exchanger for cooling the first flow of coolant, and the second flow of coolant is cooled within the second refrigerant-to-coolant heat exchanger and directed by the plurality of four-way valves through the first passenger compartment heat exchanger for lowering a temperature within the passenger compartment in a cooling mode of operation.

In still yet another possible embodiment, the first flow of coolant is heated within the first refrigerant-to-coolant heat exchanger and directed by the plurality of four-way valves through the second passenger compartment heat exchanger for raising a temperature within the passenger compartment, and the second flow of coolant is cooled within the second refrigerant-to-coolant heat exchanger and directed by the plurality of four-way valves through the outside heat exchanger for heating the second flow of coolant in a heating mode of operation.

In another possible embodiment, the first flow of coolant is heated within the first refrigerant-to-coolant heat exchanger and directed by the plurality of four-way valves through the outside heat exchanger and the first passenger compartment heat exchanger for cooling the first flow of coolant and for warming the passenger compartment, and the second flow of coolant is cooled within the second refrigerant-to-coolant heat exchanger and directed by the plurality of four-way valves through the second passenger compartment heat exchanger for cooling the passenger compartment in a dehumidification and reheat mode of operation.

In still another possible embodiment, the first flow of coolant is heated within the first refrigerant-to-coolant heat exchanger and directed by the plurality of four-way valves through an auxiliary coolant loop for heating a component or the second flow of coolant is cooled within the second refrigerant-to-coolant heat exchanger and directed by the plurality of four-way valves through the auxiliary coolant loop for cooling the component dependent upon the mode of operation.

In yet another possible embodiment, the coolant loop includes a plurality of reservoirs and manifolds for directing the first flow of coolant through at least one of said plurality of air-to-coolant heat exchangers and the second flow of coolant through at least one other of said plurality of air-to-coolant heat exchangers, dependent upon the mode of operation.

In one other possible embodiment, the first flow of coolant is heated within the first refrigerant-to-coolant heat exchanger and directed by at least one of the plurality of reservoirs and manifolds through an auxiliary coolant loop for heating a component or the second flow of coolant is cooled within the second refrigerant-to-coolant heat exchanger and directed by at least one other of the plurality of reservoirs and manifolds through the auxiliary coolant loop for cooling the component, dependent upon the mode of operation.

In accordance with the purposes and benefits described herein, a method is provided of heating and cooling a passenger compartment in a vehicle. The method may be broadly described as comprising the steps of: (a) cycling a refrigerant through a refrigerant loop; (b) routing a first coolant flow through at least one of a plurality of air-to-coolant heat exchangers; (c) routing a second coolant flow through at least one other of the plurality of air-to-coolant heat exchangers; and (d) controlling the routing steps dependent upon a mode of operation.

In another possible embodiment, the method further includes the step of routing the first flow of coolant through a first manifold, an auxiliary coolant loop, and a first reservoir for heating a component or the second flow of coolant a second manifold, the auxiliary coolant loop, and a second reservoir for cooling the component dependent upon the mode of operation.

In the following description, there are shown and described several embodiments of a vehicle heating and cooling system with a thermal management system and related methods of heating and cooling a passenger compartment in the vehicle. As it should be realized, the methods and systems are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle heating and cooling system with a thermal management system and related methods and together with the description serve to explain certain principles thereof. In the drawing figures.

Reference will now be made in detail to the present embodiments of the vehicle heating and cooling system with the thermal management system and related methods of heating and cooling a passenger compartment, examples of which are illustrated in the accompanying drawing figures, wherein like numerals are used to represent like elements.

DETAILED DESCRIPTION

Figure 1:
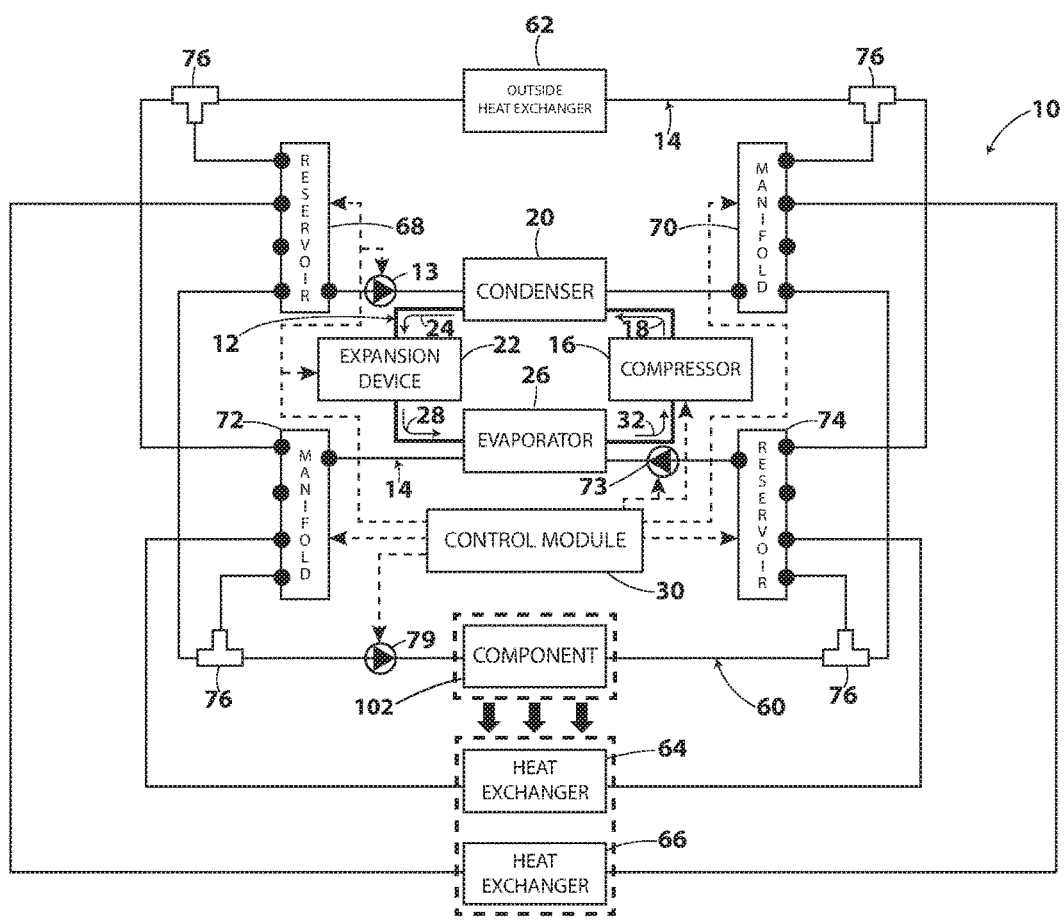
FIG. 1 is a schematic diagram of a vehicle heating and cooling system having a refrigerant loop and a secondary, coolant loop.
Figure 2A:
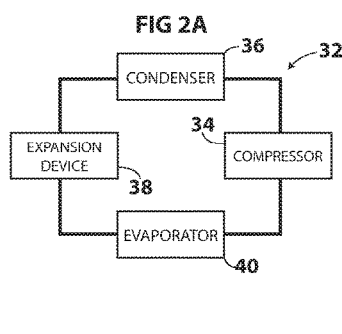
FIGS. 2A-2E depict varying alternate embodiments of the refrigerant loop.
Figure 2B:
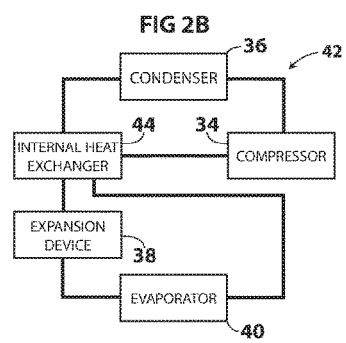
Figure 2C:
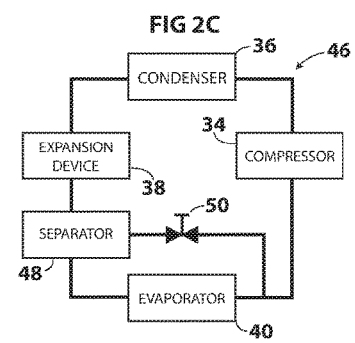
Figure 2D:
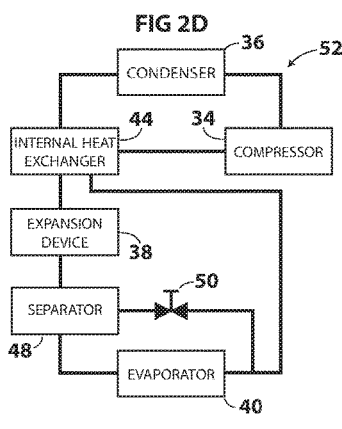
Figure 2E:
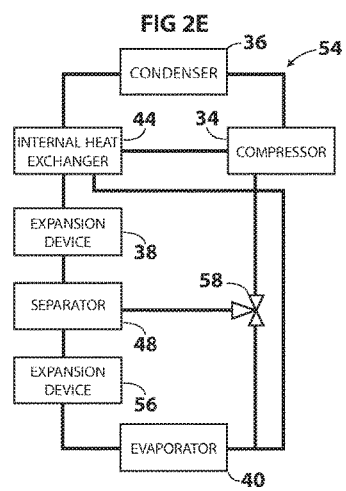

Reference is now made to FIG. 1 which illustrates a schematic diagram of a vehicle heating and cooling system 10 including a primary loop 12 and a secondary loop 14. While the system is operable in any vehicle type, it is considered most suitable for hybrid and electric vehicles. Within the primary loop 12, a fluid (e.g., an R744 or R1234yf refrigerant) in the form of a gas or vapor refrigerant enters a suction port of a compressor 16 and is compressed into a high-pressure, high-temperature gas refrigerant. The high temperature, high pressure gas refrigerant leaves the compressor 16, as shown by action arrow 18, and flows into a first refrigerant-to-coolant heat exchanger 20.

The first refrigerant-to-coolant heat exchanger 20 functions as a condenser. Within the first refrigerant-to-coolant heat exchanger, or condenser, 20, the high-pressure, high-temperature gas refrigerant discharged from the compressor 16 is cooled by giving heat to a coolant within the secondary loop 14. The cooled, high-pressure refrigerant is then sent to an expansion device 22 as shown by action arrow 24. In the expansion device 22, the outlet refrigerant from the condenser 20 is expanded to become a low-pressure, low-temperature liquid and vapor refrigerant mixture which is supplied to a second refrigerant-to-coolant heat exchanger 26 as shown by action arrow 28. The second refrigerant-to-coolant heat exchanger 26 functions as an evaporator.

The expansion device 22 could be an orifice tube with a fixed opening size, a thermal expansion device to yield a specified superheat at the outlet of the evaporator, or an electronic expansion device with adjustable opening size. When the expansion device 22 is an electronic expansion device having an opening therein through which the refrigerant passes, as in the described embodiment, regulation of the flow of refrigerant, or throttling, is used to control a temperature of the refrigerant provided to the second refrigerant-to-coolant heat exchanger 26. Increasing the pressure drop necessarily lowers the temperature of the refrigerant entering the evaporator 26. A control module 30 is electrically connected to the expansion device 22 (as shown by dashed line) and operates to control a flow and a drop in pressure of the refrigerant moving through the expansion device to ensure optimal performance. The control module 30 controls a size of the opening within the expansion device 22 which determines the drop in pressure of the refrigerant moving through the device.

Within the second refrigerant-to-coolant heat exchanger, or evaporator, 26, the low-pressure, low-temperature liquid and vapor refrigerant mixture boils to a vapor due to the heat removed from the coolant within the secondary loop 14. The low-pressure, low-temperature vapor refrigerant exits the evaporator 26, as shown by action arrow 32, and is received at the suction port of the compressor 16. In the compressor 16, the refrigerant is again compressed and cycled through the primary loop 12.

As shown in FIG. 1, the control module 30 is electrically connected to components within the system 10 (as shown by dashed lines) in addition to the expansion device 22. One such component is the compressor 16. In the described embodiment, the compressor 16 is an electric compressor driven by a variable speed motor (not shown) and the control module 30 adjusts a speed of the motor. Other embodiments may utilize fixed or variable displacement compressors driven by a compressor clutch which in turn is driven by an engine of the vehicle.

Other components connected to the control module 30 include first reservoir 68, first manifold 70, second reservoir 74, and second manifold 72. The first and second reservoirs and manifolds each include a plurality of regulating sending and receiving ports. The regulating and sending ports are indicated by the large circles throughout the drawings with active ports shown as filled circles and inactive ports shown as empty circles. In the described embodiment, the control module 30 adjusts an openness of each of the sending and receiving ports of the first and second reservoirs and manifolds dependent upon a mode operation and desired output.

While the described embodiment utilizes a single control module 30 to control the plurality of components within the system 10, any of a plurality of control modules connected to a vehicle computer via a controller area network (CAN) bus in the vehicle, as is known in the art, could be utilized to control one or more of the plurality of components of the system 10. The control module 30 is responsive to a switch (or other input means) operated by an occupant in the vehicle. The switch (e.g., an AC on/off switch) changes a mode of operation from, for example, a cooling mode to an off mode, a heating mode, or other mode of operation.

As shown generally in FIG. 2, configuration of the primary loop may vary in alternate embodiments. FIG. 2A, for example, represents a basic configuration of a primary loop 32. As described above, this primary loop includes a compressor 34, a condenser 36, an expansion device 38, and an evaporator 40. FIG. 2B represents a primary loop 42 configured similar to the basic primary loop 32 of FIG. 2A but includes an internal heat exchanger 44 positioned between the condenser 36 and expansion device 38, and the evaporator 40 and compressor 34. FIG. 2C represents another similar primary loop 46 including a separator 48 in the form of a flash gas bypass positioned between the expansion device 38 and the evaporator 40. A two-way valve 50 is positioned between the evaporator 40 and the separator 48 for controlling an amount of vapor entering the compressor 34. Similarly, FIG. 2D reintroduces the internal heat exchanger 44 of FIG. 2B into primary loop 52 between the condenser 36 and the expansion device 38. Last, a primarily loop 54 is shown in FIG. 2E that is similar to FIG. 2D but includes a second expansion device 56 positioned between the separator 48 and the evaporator 40. The addition of the second expansion device 56 also required replacement of the two-way valve 50 with a three-way valve 58. The three-way valve 58 is connected to a control module and controls an amount of intermediate-pressure, intermediate-temperature vapor entering the suction port of the compressor 34. The operation of each of the noted primary loops is known in the art and reference to a primary loop or a refrigerant loop herein refers to any of the FIG. 2 embodiments or other known refrigerant loops.

As eluded to above, the primary loop 12 interacts with the secondary loop 14 primarily through heat transfers occurring within the first refrigerant-to-coolant heat exchanger 20 and the second refrigerant-to-coolant heat exchanger 26. Within the secondary loop 14, control module 30 controls coolant flows through a plurality of air-to-coolant heat exchangers dependent upon a mode of operation of the system 10. More specifically, the secondary loop 14 includes a plurality of air-to-coolant heat exchangers and an auxiliary coolant loop 60 interconnected to allow the coolant flows to be selectively directed or routed there through. In the described embodiment, the plurality of air-to-coolant heat exchangers includes an outside air-to-coolant heat exchanger 62, and first and second passenger compartment air-to-coolant heat exchangers 64, 66.

As shown in FIG. 1, the secondary loop 14 further includes a first reservoir 68 and a first manifold 70 used to direct a first flow of coolant through at least one of the plurality of air-to-coolant heat exchangers 62, 64, or 66, and a second manifold 72 and a second reservoir 74 for directing a second flow of coolant through at least one other of the plurality of air-to-coolant heat exchangers dependent upon the mode of operation. The control module 30, described above, controls the openness of the sending and receiving ports in the first reservoir 68 and first manifold 70 to direct the first flow of coolant and in the second manifold 72 and second reservoir 74 to direct the second flow of coolant dependent upon the mode of operation and desired output. The utilization of reservoirs and manifolds with modulating functionality eliminates use of certain valves and junctions which results in both cost savings and minimized coolant leakage. The varying directions of the coolant flows are described for the various modes of operation below.

Figure 3:
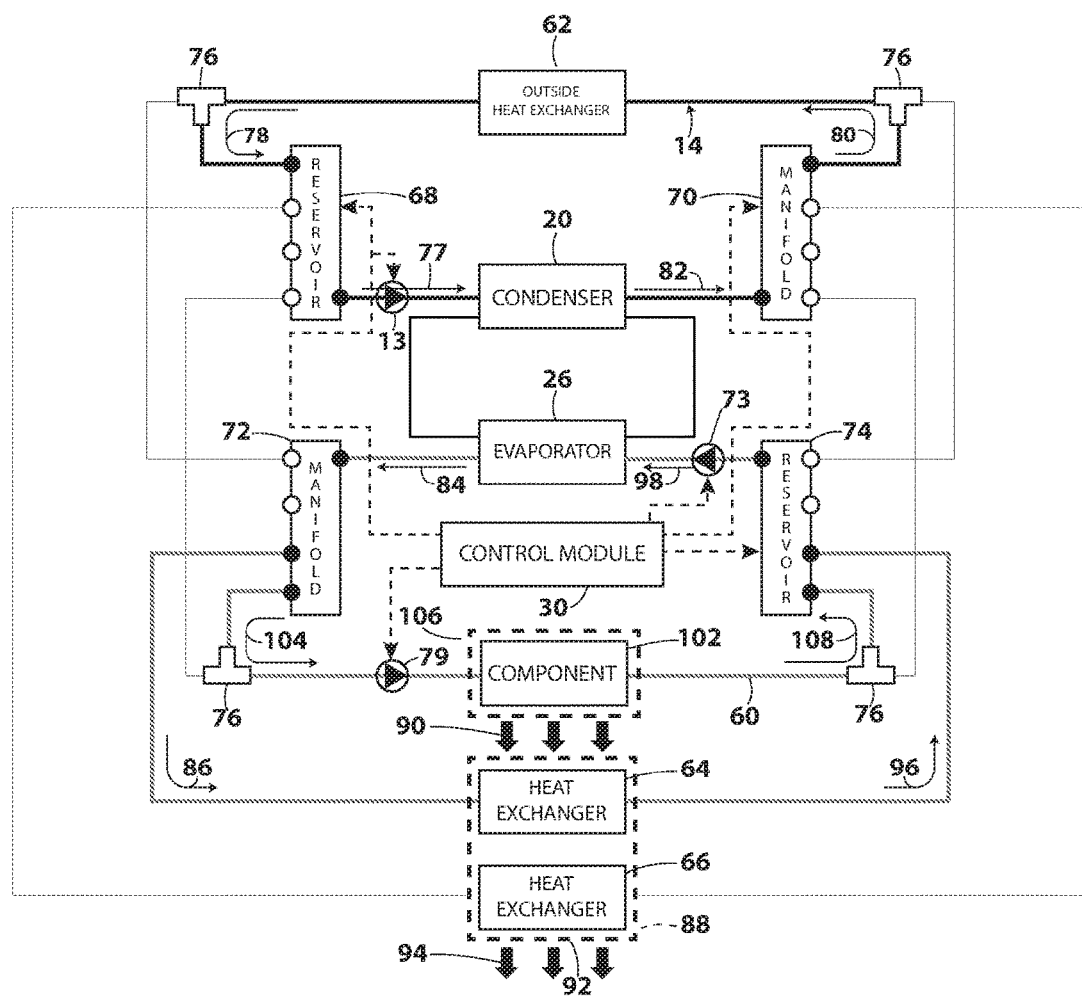
FIG. 3 is a schematic diagram of a vehicle heating and cooling system having modulating manifolds and operating in a cooling mode.

In a cooling mode of operation, as shown in FIG. 3, a first pump 13 in the secondary loop 14 moves warmed coolant (as shown by action arrow 82) from the condenser 20 to the first manifold 70. The first manifold 70 serves as a hot coolant manifold or chamber having one receiving port and four sending ports with modulating functionality. As indicated above, control module 30 is electrically connected to the first manifold 70 opening the receiving port and one sending port (shown by filled circles) to direct the warmed coolant through intervening T-junction 76 to the first air-to-coolant heat exchanger 62 as shown by action arrow 80.

The first air-to-coolant heat exchanger 62 is an outside heat exchanger (e.g. a low temperature radiator) positioned along a front of the vehicle as is known in the art. Within the outside air-to-coolant heat exchanger 62, warmed coolant discharged from the condenser 20 is cooled due primarily to the effect of outside air. A fan, active grille shutters, or the like may be utilized to create and regulate a flow of air over the outside air-to-coolant heat exchanger 62.

As indicated above, control module 30 is electrically connected to the first reservoir 68 and operates to open one receiving port and a sending port (shown by filled circles) to receive the cooled coolant from the outside heat exchanger 62, as shown by action arrow 78, and to direct the coolant back to the condenser 20, as shown by action arrow 77, via pump 13. The first reservoir 68 is an accumulator which serves as a hot coolant reservoir containing four receiving ports and one sending port with modulating functionality. In alternative embodiments, the manifolds and reservoirs described herein may include more or fewer receiving and/or sending ports.

Also within the secondary loop 14, cold coolant is directed from the evaporator 26 to a second manifold 72 as shown by action arrow 84. The second manifold 72 serves as a cold coolant manifold or chamber also having one receiving port and four sending ports with modulating functionality. As indicated above, control module 30 is electrically connected to the second manifold 72 opening the receiving port and one sending port to direct the cooled coolant to the second air-to-coolant heat exchanger 64 as shown by action arrow 86.

In the described cooling mode, the second air-to-coolant heat exchanger, or first passenger compartment heat exchanger, 64 functions as a cooler. As is known in the art, the second air-to-coolant heat exchanger 64 is positioned within a heating, ventilation, and air conditioning (HVAC) case 88 of the vehicle and is used to cool a passenger compartment (not shown). Warm, moist air flowing across the second air-to-coolant heat exchanger 64 (as shown by arrows 90) transfers its heat to the cold coolant within the second air-to-coolant heat exchanger. The byproducts are a lowered temperature air entering the passenger compartment and condensation from the air which is routed from the second air-to-coolant heat exchanger 64 to an exterior of the vehicle. A blower (not shown) blows the air across the second air-to-coolant heat exchanger 64 and through a vent 92 into the passenger compartment as shown by arrows 94. This process results in the passenger compartment having a cooler, drier air therein.

Within the second air-to-coolant heat exchanger 64, the cold coolant is warmed due to the heat removed from the air and directed to a second reservoir 74 (as shown by action arrow 96). The second reservoir 74 is an accumulator which serves as a cold coolant reservoir having receiving and sending ports with modulating functionality. Control module 30 is further electrically connected to a second pump 73 and second reservoir 74 and operates to open one receiving port and the sending port to receive the cooled coolant from the second air-to-coolant heat exchanger 64, as shown by action arrow 96, and to direct the coolant back to the evaporator 26, as shown by action arrow 98. In the evaporator 26, the warmed coolant is again cooled by giving its heat to the refrigerant in the primary loop 12, and cycled through the secondary loop 14.

In the described embodiment, the secondary loop 14 further includes an auxiliary coolant loop 60 for thermally managing, or regulating, a temperature of at least one component 102 (e.g., a battery, electronics, or brakes, etc.). While the auxiliary coolant loop 60 provides the ability to cool or warm the component 102, as will be described further below, the component is only cooled in the described cooling mode of operation as an illustration. This presupposes that the system 10 operates in the cooling mode due to high ambient temperatures that are sufficient to warrant the need for cooling of the component 102.

Within the secondary loop 14, as shown in FIG. 3, cold coolant is directed from a second port of the second manifold 72 through an intervening T-junction 76 into the auxiliary coolant loop 60 as shown by action arrow 104. Again, operation of the second manifold 72 is controlled by control module 30 which is electrically connected to the second manifold and a third pump 79. In this mode of operation, the control module 30 opens one of the sending ports to direct the cooled coolant through the intervening T-junction to a compartment 106 housing the component 102 as shown by action arrow 104. It should be noted that the third pump 79 may be turned off in this mode of operation and that the compartment 106 may not be utilized in all embodiments.

Within the compartment 106, the cold coolant flows past the component 102 drawing heat away from the component and warming the coolant. The warmed coolant is then directed by an intervening T-junction 76 to the second reservoir 74 as shown by action arrow 108. Within the second reservoir 74, the warmed coolant is combined with the warmed coolant from the first passenger compartment air-to-coolant heat exchanger 64. As indicated above, control module 30 is electrically connected to the second reservoir 74 opening one receiving port to receive the warmed coolant from the second air-to-coolant heat exchanger 64, as shown by action arrow 96, and to direct the coolant back to the evaporator 26 via pump 73, as shown by action arrow 98. In the evaporator 26, the combined warmed coolant is again cooled by giving its heat to the refrigerant in the primary loop 12, and cycled through the secondary loop 14.

Figure 4:
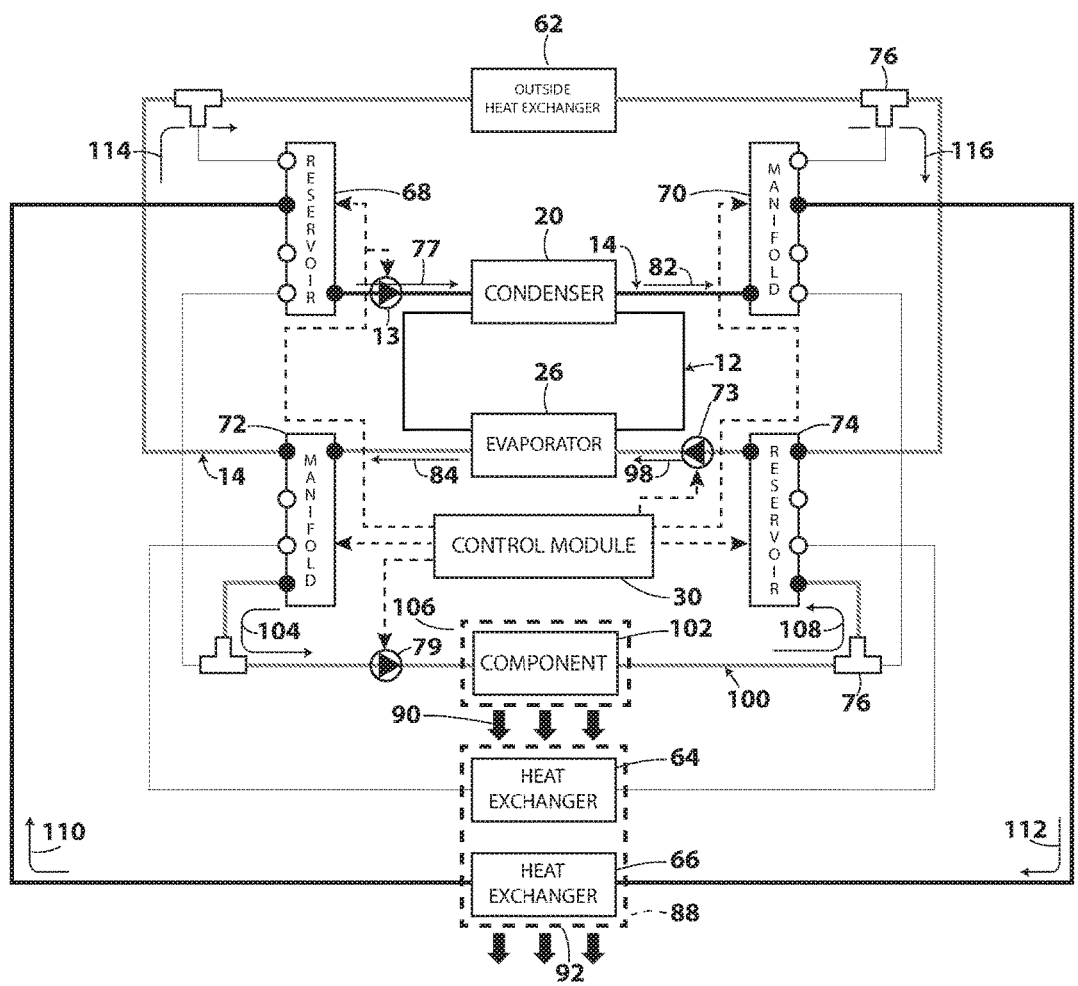
FIG. 4 is a schematic diagram of a vehicle heating and cooling system having modulating manifolds and operating in a heating mode while providing component cooling.

In a heating mode of operation, as shown in FIG. 4, the secondary loop 14 directs cold coolant from the evaporator 26 to the second manifold 72 as shown by action arrow 84. The second manifold 72 is connected to the outside air-to-coolant heat exchanger 62. The control module 30 is electrically connected to the second manifold 72 opening one sending port and the receiving port to direct the cooled coolant thru an intervening T-junction 76 to the outside air-to-coolant heat exchanger 62 as shown by action arrow 114. In the outside air-to-coolant heat exchanger 62, the cooled coolant discharged from the evaporator 26 is warmed due primarily to the effect of outside air. As shown by action arrow 116, the warmed coolant is directed by an intervening T-junction 76 to the second reservoir 74. As indicated above, control module 30 is electrically connected to the second reservoir 74 opening one receiving port and the sending port to direct the warmed coolant back to the evaporator 26 via pump 73 as shown by action arrow 98.

The secondary loop 14 also directs warmed coolant (as shown by action arrow 82) from the condenser 20 to the first manifold 70. The first manifold 70 is connected to a third air-to-coolant heat exchanger 66. The control module 30 is electrically connected to the first manifold 70 to open one of the sending ports and direct the warmed coolant to the third air-to-coolant heat exchanger 66, as shown by action arrow 112. The signal could be in response to the switch or other input means operated by the occupant in the vehicle to change the mode of operation.

In the described heating mode, the third air-to-coolant heat exchanger, or second passenger compartment heat exchanger, 66 functions as a heater core. As is known in the art, the third air-to-coolant heat exchanger 66 is positioned within the HVAC case 88 of the vehicle and is used to warm the passenger compartment. Cold air flowing across the third air-to-coolant heat exchanger 66 (as shown by arrows 90) absorbs heat from the warm coolant thereby increasing the temperature of the air. A blower (not shown) blows air across the third air-to-coolant heat exchanger 66 and through the vent 92 into the passenger compartment. This process results in the passenger compartment having a warmer air therein.

Within the third air-to-coolant heat exchanger 66, the warm coolant is cooled due to the heat given to the air and directed to the first reservoir 68 (as shown by action arrow 110). Again, control module 30 is electrically connected to the first pump 13 and the first reservoir 68 opening one of the receiving ports and signaling the first reservoir to direct the cooled coolant to the condenser 20 as shown by action arrow 77. In the condenser 20, the cooled coolant is again warmed by absorbing its heat from the refrigerant in the primary loop 12, and cycled through the secondary loop 14.

As described above, the secondary loop 14 includes an auxiliary coolant loop for regulating a temperature of at least one component 102 (e.g., a battery, electronics, or brakes, etc.). In the heating mode, the auxiliary coolant loop 100 may be used to heat or cool the component 102. FIG. 4 shows the secondary loop 14 utilized to cool the component 102 in the heating mode.

In this instance, cold coolant is directed by a T-junction 76 from the second manifold 72 into the auxiliary coolant loop 100 as shown by action arrow 104. As described above, the second pump 73 is electrically connected to the control module 30 which drives the cold coolant from the second manifold 72 through the compartment 106 housing the component 102. The third pump 79 may be turned off in this mode of operation.

The cold coolant flows past the component 102 drawing heat away from the component and warming the coolant. The warmed coolant is then directed by another T-junction 76 to the second reservoir 74, as shown by action arrow 108, where the warmed coolant is combined with the warmed coolant from the outside air-to-coolant heat exchanger 62. As indicated above, control module 30 is electrically connected to the second reservoir 74 opening one of the receiving ports for receiving the directed warmed coolant from the compartment 106 to the second reservoir 74. The second reservoir 74 further directs the warmed coolant, combined with the warmed coolant from the outside air-to-coolant heat exchanger 62, to the evaporator 26, as shown by action arrow 98. In the evaporator 26, the combined warmed coolant is again cooled by giving its heat to the refrigerant in the primary loop 12, and cycled through the secondary loop 14.

Figure 5:
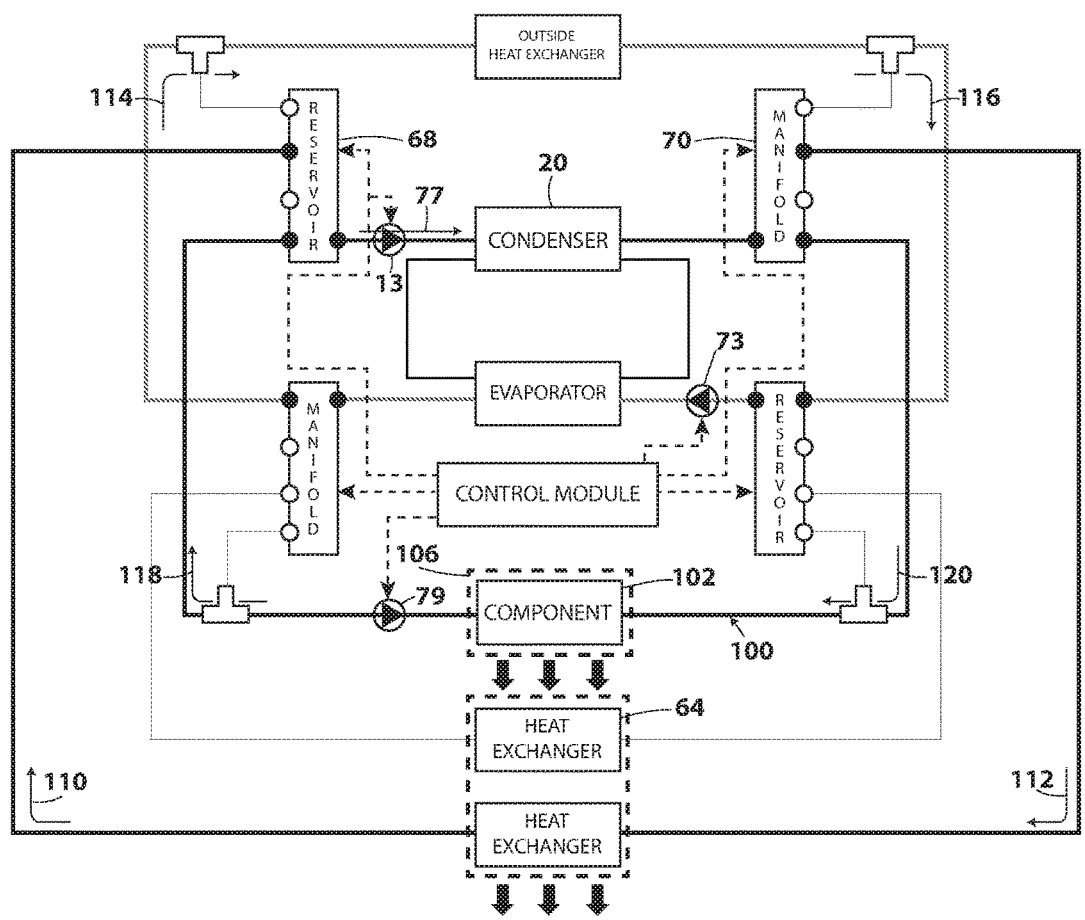
FIG. 5 is a schematic diagram of a vehicle heating and cooling system having modulating manifolds and operating in a heating mode while providing component warming.

As shown in FIG. 5, the secondary loop 14 may also be utilized to warm a component 102 in the heating mode. In this instance, warm coolant is directed through a T-junction 76 from the first manifold 70 into the auxiliary coolant loop 100 as shown by action arrow 120. The first pump 13 is electrically connected to the control module 30 which drives the hot coolant from the first manifold 70 through the compartment 106 housing the component 102. The third pump 79 is turned off in this mode of operation but utilized in others as described below.

The warm coolant flows past the component 102 providing heat to the component and cooling the coolant. The cooled coolant is then directed by the T-junction 76 to the first reservoir 68 as shown by action arrow 118. Within the first reservoir 68, the cooled coolant is combined with cooled coolant from the third air-to-coolant heat exchanger 66. As indicated above, control module 30 is electrically connected to the first reservoir 68 opening one of the receiving ports and a sending port to direct the cooled coolant to the condenser 20 as shown by action arrow 77. In the condenser 20, the combined cooled coolant is again warmed by absorbing heat from the refrigerant in the primary loop 12, and cycled through the secondary loop 14.

Figure 6:
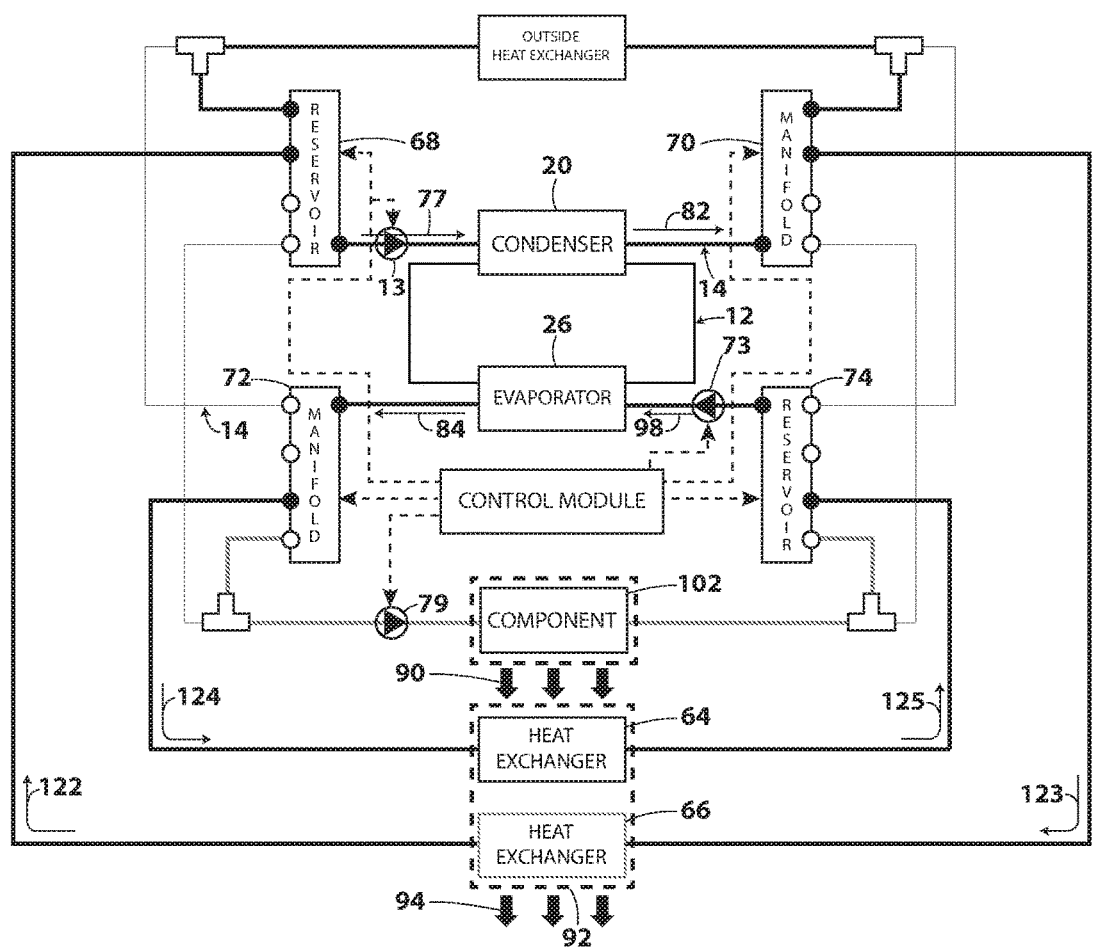
FIG. 6 is a schematic diagram of a vehicle heating and cooling system having modulating manifolds and operating in a dehumidification mode while providing component cooling.

In a dehumidification mode of operation, as shown in FIG. 6, cold coolant is pumped through the evaporator 26 to the second manifold 72, as shown by action arrow 84, and warm coolant is concurrently pumped through the condenser 20 to the first manifold 72 as shown by action arrow 82. The second manifold 72 is connected to the second air-to-coolant heat exchanger 64. The control module 30 is electrically connected to the second manifold 72 opening one of the sending ports to direct the cooled coolant to the second air-to-coolant heat exchanger 64 as shown by action arrow 124.

In the described dehumidification mode, the second air-to-coolant heat exchanger 64 functions as a cooler, as described above in the cooling mode of operation, and is used to cool and dehumidify the moist, warm air. Within the second air-to-coolant heat exchanger 64, the cold coolant is warmed due to the heat removed from the air and directed to the second reservoir 74 (as shown by action arrow 125). Control module 30 is electrically connected to the second reservoir 74 opening one of the receiving ports. Pump 73 draws the warmed coolant from the second reservoir 74 pumping it into the evaporator 26 as shown by action arrow 98. In the evaporator 26, the warmed coolant is again cooled by giving its heat to the refrigerant in the primary loop 12, and cycled through the secondary loop 14.

While the second air-to-coolant heat exchanger 64 functions to lower the humidity of the air within the passenger compartment for the comfort of the passengers or to defog one or more of the windows/windshield within the passenger compartment, the air in the passenger compartment is also cooled through this process. In this scenario, it may be desired to re-heat or warm the air in the passenger compartment to ensure the comfort of the passengers. Accordingly, in the dehumidification mode of operation, warmed coolant from the first manifold 70 is concurrently connected to the third air-to-coolant heat exchanger 66. The control module 30 is electrically connected to the first manifold 70 which directs the warmed coolant to the third air-to-coolant heat exchanger 66 as shown by action arrow 123.

In the described dehumidification mode, the third air-to-coolant heat exchanger 66 functions as a heater core to heat the cooled, dehumidified air and supply warm air to the passenger compartment. Within the third air-to-coolant heat exchanger 66, the warm coolant is cooled due to the heat removed to the air and directed to the first reservoir 68 (as shown by action arrow 122). Again, control module 30 is electrically connected to the first reservoir 68 opening one of the receiving ports. Pump 13 draws the cooled coolant from the first reservoir 68 and pumps it into the condenser 20 as shown by action arrow 77. In the condenser 20, the cooled coolant is again warmed by absorbing heat from the refrigerant in the primary loop 12, and cycled through the secondary loop 14.

In the dehumidification mode of operation, the auxiliary coolant loop may operate to either cool or warm the component 102 in the manner described above for the heating mode of operation.

Figure 7:
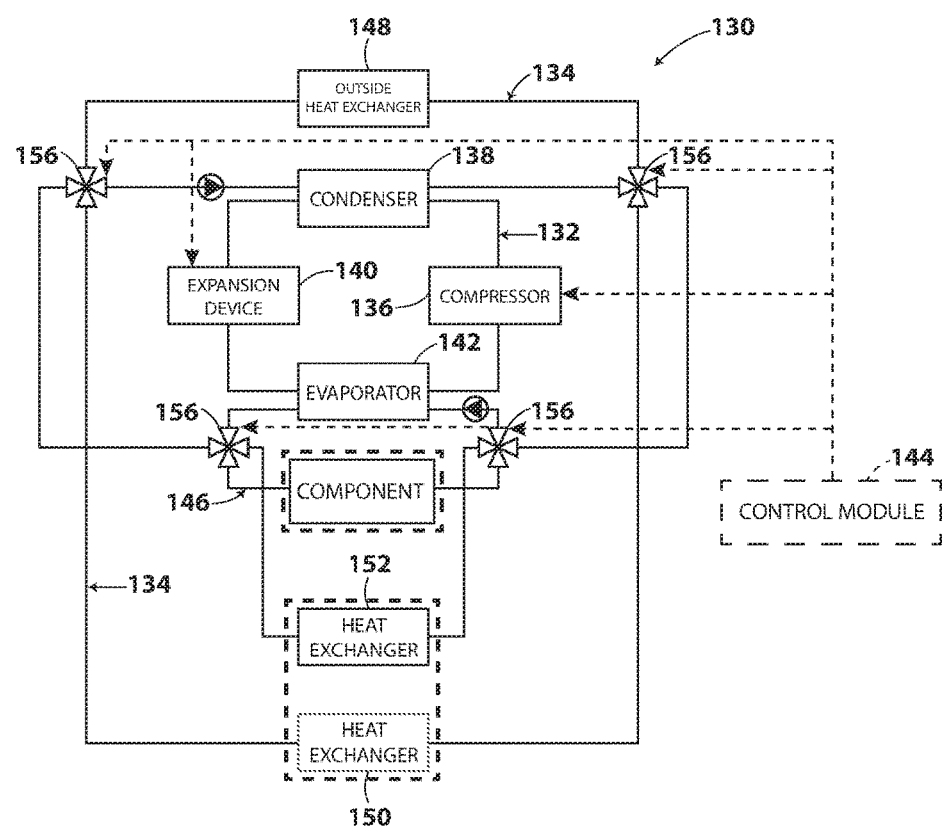
FIG. 7 is a schematic diagram of an alternate embodiment of the vehicle heating and cooling system having a plurality of regulating valves.

FIG. 7 illustrates a schematic diagram of an alternate embodiment of a vehicle heating and cooling system 130 including a primary loop 132 and a secondary loop 134. The primary loop 132 includes at least a compressor, 136, a first refrigerant-to-coolant heat exchanger, or condenser 138, an expansion device 140, and a second refrigerant-to-coolant heat exchanger, or evaporator, 142. As described above, the primary loop 132 interacts with the secondary loop 134 primarily through heat transfers occurring within the condenser 138 and the evaporator 142. The functionality of the primary loop 132 and its components is described above with regard to the first described embodiment. In addition, the primary loop 132 may also encompass any of the embodiments described in FIG. 2.

As shown, the secondary loop 134 is connected to allow coolant flows to be directed or routed through a plurality of air-to-coolant heat exchangers dependent upon a mode of operation. More specifically, the secondary loop 134 includes a plurality of air-to-coolant heat exchangers, pumps, and an auxiliary coolant loop 146 interconnected to allow the coolant flows to be selectively directed therethrough. The plurality of air-to-coolant heat exchangers includes an outside heat exchanger 148, and first and second passenger compartment heat exchangers 152, 150, and the control module 144 controls the direction of the coolant flows dependent upon the mode of operation of the system 130.

In the described alternate embodiment, the secondary loop 134 further includes a plurality of four-way valves to control a first flow of coolant through at least one of the plurality of air-to-coolant heat exchangers 148, 150, 152, and a second flow of coolant through at least one other of the plurality of air-to-coolant heat exchangers dependent upon the mode of operation. The control module 144, as generally described above, controls each of the plurality of four-way valves (each designated reference numeral 156) to direct the first and second flows of coolant dependent upon the mode of operation.

Each of the plurality of valves is a four-way valve that may be replaced in alternate embodiments by a series of one-way, two-way, and/or three-way valves sufficient to direct the coolant flows in desired directions dependent upon the mode of operation. Again, the valves in the series of valves receive signals from and are controlled by the control module 144. The varying directions the valves direct the coolant flows are described in more detail for the various modes of operation below.

Figure 8:
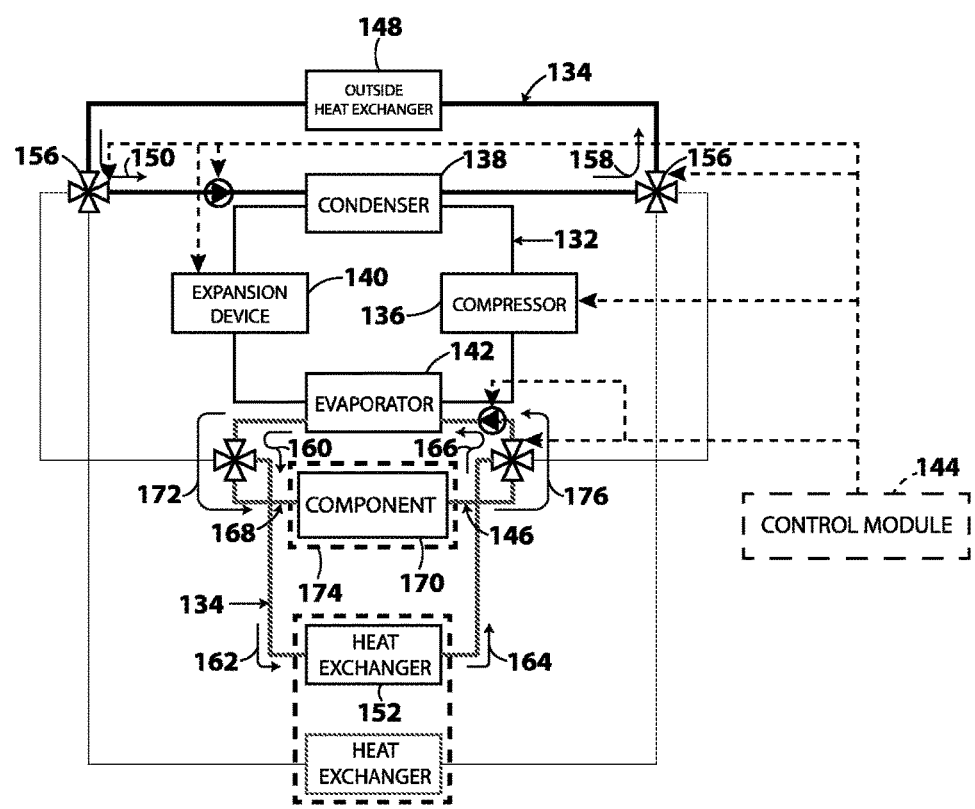
FIG. 8 is a schematic diagram of the alternate embodiment of the vehicle heating and cooling system having a plurality of regulating valves operating in a cooling mode.

In a cooling mode of operation, as shown in FIG. 8, the secondary loop 134 directs warmed coolant (as shown by action arrow 158) from the condenser 138 to the outside heat exchanger 148 via a first four-way valve 156. As indicated above, control module 144 is electrically connected to the intervening four-way valve 156 and signals the four-way valve to direct the warmed coolant to the outside heat exchanger 148. The outside heat exchanger 148 functions as described above in the first embodiment to cool the coolant. Again, cooled coolant is directed by a second four-way valve 156 through pump 149 back to the condenser 138, as shown by action arrow 150, in response to a signal from the control module 144.

Also, within the secondary loop 134, cold coolant is directed from the evaporator 142 to a second air-to-coolant heat exchanger 152 via a third four-way valve 156. As indicated above, control module 144 is electrically connected to the intervening four-way valve 156 and pump 165 and signals the four-way valve to direct the cooled coolant to the second air heat exchanger 152 as shown by action arrows 160 and 162.

In the described cooling mode, the second air-to-coolant heat exchanger 152 functions as a cooler in the manner described above for the second air-to-coolant heat exchanger 64. Within the second air-to-coolant heat exchanger 152, the cold coolant is warmed due to the heat removed from the air and directed through a fourth four-way valve 156 back to the evaporator 142 through pump 165. As indicated above, control module 144 is electrically connected to the intervening four-way valve 156 and signals the four-way valve to direct the warmed coolant to the evaporator 142 as shown by action arrows 164 and 166. In the evaporator 142, the warmed coolant is again cooled by giving its heat to the refrigerant in the primary loop 132, and cycled through the secondary loop 134.

The alternate secondary loop 134 further includes an auxiliary coolant loop 146 for regulating a temperature of at least one component 170 (e.g., a battery, electronics, or brakes, etc.). While the auxiliary coolant loop 146 provides the ability to cool or warm the component 170, as will be described further below, the component is only cooled in the described cooling mode of operation. Again, this presupposes that the system 130 operates in the cooling mode due to high ambient temperatures that are sufficient to warrant the need for cooling of the component.

Within the secondary loop 134, cold coolant is directed from the evaporator 142 into the auxiliary coolant loop 146, as shown by action arrow 172, via the third four-way valve 156. Again, control module 144 is electrically connected to the intervening four-way valve 156 and signals the four-way valve to direct the cooled coolant through a compartment 174 housing the component 170. The cold coolant flows past the component 170 drawing heat away from the component and warming the coolant. The warmed coolant is then directed by the fourth four-way valve 156 through pump 165 to the evaporator 142 as shown by action arrow 176.

As shown, the warmed coolant is combined with the warmed coolant from the second air-to-coolant heat exchanger 152. As indicated above, control module 144 is electrically connected to the intervening third and fourth four-way valves 156 and signals the four-way valves to direct the warmed coolant to evaporator 142. In the evaporator 142, the combined warmed coolant is again cooled by giving its heat to the refrigerant in the primary loop 132, and cycled through the secondary loop 134.

Figure 9:
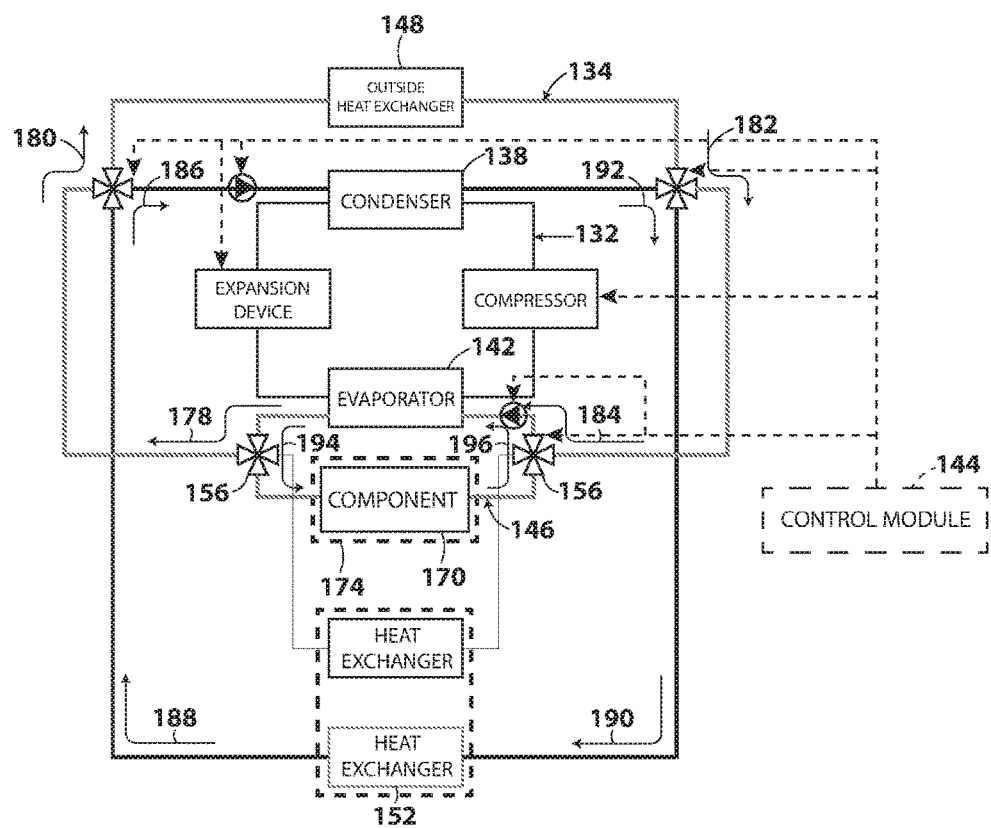
FIG. 9 is a schematic diagram of the alternate embodiment of the vehicle heating and cooling system having a plurality of regulating valves operating in a heating mode.

In a heating mode of operation, as shown in FIG. 9, the secondary loop 134 directs cold coolant from the evaporator 142 to the outside heat exchanger 148 via the third and second four-way valves 156. The control module 144 signals the intervening four-way valves 156 to direct the cooled coolant to the outside heat exchanger 148 as shown by action arrows 178 and 180. In the outside heat exchanger 148, the cooled coolant discharged from the evaporator 138 is warmed due primarily to the effect of outside air. The warmed coolant is drawn by pump 165 and directed by the first and fourth four-way valves 156 back to the evaporator 142 as shown by action arrows 182 and 184. As indicated above, control module 144 is electrically connected to the first and fourth four-way valves 156 and pump 165 and signals the four-way valves accordingly.

Also within the secondary loop 134, warmed coolant is pumped through the condenser 138 and directed to the third air-to-coolant heat exchanger 150 via the first four-way valve 156 as shown by action arrows 192 and 190. The control module 144 signals the first four-way valve 156 to direct the warmed coolant to the third air-to-coolant heat exchanger 150.

In the described heating mode, the third air-to-coolant heat exchanger 150 functions as a heater core in the manner described above for third air-to-coolant heat exchanger 66. Within the third air-to-coolant heat exchanger 150, the warm coolant is cooled due to the heat given to the air and directed through the second four-way valve 156 back to the condenser 138 through pump 149 as shown by action arrows 188 and 186. Again, control module 144 is electrically connected to the intervening pump 149 and four-way valve 156 and signals the four-way valve to direct the cooled coolant to the condenser 138. In the condenser 138, the cooled coolant is again warmed by absorbing heat from the refrigerant in the primary loop 132, and cycled through the secondary loop 134.

As described above, the alternate secondary loop 134 includes an auxiliary coolant loop 146 for regulating a temperature of at least one component 170. In the heating mode, the auxiliary coolant loop 146 may be used to cool the component 170 as shown in FIG. 9. In this instance, cold coolant is directed from the evaporator 142 into the auxiliary coolant loop 146, as shown by action arrow 194, via the third four-way valve 156. Again, control module 144 is electrically connected to the intervening four-way valve 156 and signals the four-way valve to direct the cold coolant through the compartment 174. The cold coolant flows past the component 170 drawing heat away from the component and warming the coolant. The warmed coolant is then directed by the fourth four-way valve 156 back to the evaporator 142 as shown by action arrow 196.

As shown, the warmed coolant is combined with the warmed coolant from the first air-to-coolant heat exchanger 148 as it passes through the fourth four-way valve 156. As indicated above, control module 144 is electrically connected to the intervening fourth four-way valve and signals the four-way valve to direct the warmed coolant from the compartment 174 to the fourth four-way valve which further directs the warmed coolant, combined with the warmed coolant from the outside heat exchanger 148, through pump 165 to the evaporator 142. In the evaporator 142, the combined warmed coolant is again cooled by giving its heat to the refrigerant in the primary loop 132, and cycled through the secondary loop 134.

Figure 10:
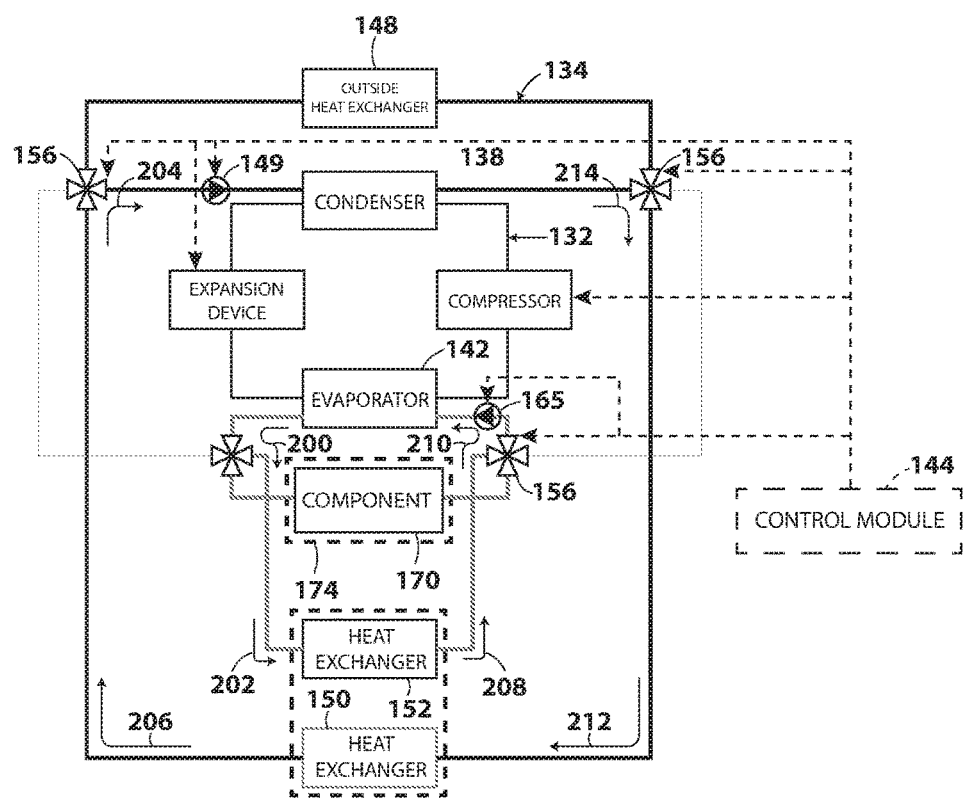
FIG. 10 is a schematic diagram of the alternate embodiment of the vehicle heating and cooling system having a plurality of regulating valves operating in a dehumidification and reheating mode.

In a dehumidification mode of operation, shown in FIG. 10, cold coolant is directed from the evaporator 142 to the second air-to-coolant heat exchanger 152 as shown by action arrows 200 and 202 and warm coolant is concurrently directed from the condenser 138 to the third air-to-coolant heat exchanger 150 as shown by action arrows 214 and 212.

More specifically, the second air-to-coolant heat exchanger 152 functions as a cooler in the manner described above for second air-to-coolant heat exchanger 64, and is used to cool and dehumidify the moist, warm air. Within the second air-to-coolant heat exchanger 152, the cold coolant is warmed due to the heat removed from the air and directed through fourth four-way valve 156 and pump 165 back to the evaporator 142. As indicated above, control module 144 is electrically connected to the pump 165 and intervening four-way valve 156 and signals the four-way valve to direct the warmed coolant to the evaporator 142 as shown by action arrows 208 and 210. In the evaporator 142, the warmed coolant is again cooled by giving its heat to the refrigerant in the primary loop 132, and cycled through the secondary loop 134.

The third air-to-coolant heat exchanger 150 functions as a heater core to heat the cooled, dehumidified air and supply warm air to the passenger compartment. Within the third air-to-coolant heat exchanger 150, the warm coolant is cooled due to the heat removed to the air and directed through the second four-way valve 156 and pump 149 to the condenser 138 as shown by action arrows 206 and 204. Again, control module 144 is electrically connected to the pump 149 and intervening four-way valve 156 and signals the four-way valve to direct the cooled coolant to the condenser 138. In the condenser 138, the cooled coolant is again warmed by absorbing heat from the refrigerant in the primary loop 132, and cycled through the secondary loop 134.

In the dehumidification mode of operation, the auxiliary coolant loop 146 may operate to cool or warm the component 170 in the manner described above.

In accordance with the method of heating and cooling a passenger compartment in a vehicle, a refrigerant is cycled through a refrigerant loop 12, a first coolant flow is routed through at least one of a plurality of air-to-coolant heat exchangers 62, 64, 66, and a second coolant flow is routed through at least one other of the plurality of air-to-coolant heat exchangers. A control module 30 is electrically connected to each of the plurality of air-to-coolant heat exchangers 62, 64, and 66 and controls the routing of the first and second coolant flows dependent upon a mode of operation of the vehicle.

In another possible method, the first flow of coolant may be routed through a first manifold 70, an auxiliary coolant loop 60, and a first reservoir 68 for heating a component 102 and/or the second flow of coolant may be routed through a second manifold 72, the auxiliary coolant loop, and a second reservoir 74 for cooling the component dependent upon the mode of operation. Of course other methods of heating and cooling a passenger compartment in a vehicle may be utilized as described above.

The foregoing has been presented for purposes of illustration and description. It is not intended to be exhaustive or to limit the embodiments to the precise form disclosed. Obvious modifications and variations are possible in light of the above teachings. For example, the devices controlled by control module 30 in the described embodiment could be controlled by a plurality of control modules within the vehicle. The plurality of control modules could each control one or more devices within the system and communicate with one another via a controller area network (CAN) bus.

In still other embodiments, the heating and cooling system may not include the thermal management system and/or the system may capture waste heat such as heat drawn away from the component in a heating mode of operation. In such a scenario looking at FIG. 5, for example, warmed coolant exiting the component housing 106 could be directed to the first manifold 70 instead of the first reservoir 68 by activating the third pump 79 through signals from the control module 30. Within the first manifold 70, the coolant warmed by the component would be combined with the warmed coolant from the condenser 20 before being used to warm the passenger compartment via the third air-to-coolant heat exchanger 66 in order to take full advantage of the waste heat of the component 102. All such modifications and variations are within the scope of the appended claims when interpreted in accordance with the breadth to which they are fairly, legally and equitably entitled.

What is claimed:

1. A vehicle having a heating and cooling system, comprising:
    a refrigerant loop having first and second refrigerant-to-coolant heat exchangers;
    a coolant loop having a first reservoir and a first manifold for directing a first flow of coolant through at least one of a plurality of air-to-coolant heat exchangers, and a second reservoir and a second manifold for directing a second flow of coolant through at least one other of said plurality of air-to-coolant heat exchangers dependent upon a mode of operation; and
    a control module for controlling said first and second coolant reservoirs and said first and second manifolds dependent upon the mode of operation.

2. The vehicle having a heating and cooling system of claim 1, wherein said plurality of air-to-coolant heat exchangers includes at least an outside heat exchanger, and first and second passenger compartment heat exchangers.

3. The vehicle having a heating and cooling system of claim 2, wherein each of said first and second reservoirs and manifolds include at least one sending port and at least one receiving port and said control module controls a degree of openness of said at least one sending port and said at least one receiving port.

4. The vehicle having a heating and cooling system of claim 3, wherein the first flow of coolant is heated within said first refrigerant-to-coolant heat exchanger and directed through said first manifold, said outside heat exchanger, and said first reservoir for cooling the first flow of coolant, and the second flow of coolant is cooled within said second refrigerant-to-coolant heat exchanger and directed through said second manifold, said first passenger compartment heat exchanger, and said second reservoir for lowering a temperature within the passenger compartment in a cooling mode of operation.

5. The vehicle having a heating and cooling system of claim 3, wherein the first flow of coolant is heated within said first refrigerant-to-coolant heat exchanger and directed through said first manifold, said second passenger compartment heat exchanger, and said first reservoir for raising a temperature within the passenger compartment, and the second flow of coolant is cooled within said second refrigerant-to-coolant heat exchanger and routed through said second manifold, said outside heat exchanger, and said second reservoir for warming the second flow of coolant in a heating mode of operation.

6. The vehicle having a heating and cooling system of claim 3, wherein the first flow of coolant is heated within said first refrigerant-to-coolant heat exchanger and directed through said first manifold, said outside heat exchanger, said second passenger compartment heat exchanger, and said first reservoir for cooling the first flow of coolant and for warming the passenger compartment, and the second flow of coolant is cooled within said second refrigerant-to-coolant heat exchanger and directed through said second manifold, said first passenger compartment heat exchanger, and said second reservoir for cooling the passenger compartment in a dehumidification and reheat mode of operation.

7. The vehicle having a heating and cooling system of claim 3, wherein the first flow of coolant is heated within said first refrigerant-to-coolant heat exchanger and directed through said first manifold, an auxiliary coolant loop, and said first reservoir for heating a component.

8. The vehicle having a heating and cooling system of claim 3, wherein the second flow of coolant is cooled within said second refrigerant-to-coolant heat exchanger and directed through said second manifold, an auxiliary coolant loop, and said second reservoir for cooling a component.

9. A vehicle heating and cooling system, comprising:
    a refrigerant loop having at least first and second refrigerant-to-coolant heat exchangers, a compressor, and an expansion device through which a refrigerant flows;
    a coolant loop connected to allow a first flow of coolant to be directed through at least one of a plurality of air-to-coolant heat exchangers, and to allow a second flow of coolant to be directed through at least one other of said plurality of air-to-coolant heat exchangers dependent upon a mode of operation; and
    a control module for controlling said first and second flows of coolant dependent upon the mode of operation.

10. The vehicle heating and cooling system of claim 9, wherein said refrigerant loop further includes at least one of an internal heat exchanger, a two-way valve, a three-way valve, an accumulator, and a second expansion device.

11. The vehicle heating and cooling system of claim 9, wherein said coolant loop includes a plurality of four-way valves for directing the first flow of coolant through at least one of said plurality of air-to-coolant heat exchangers, and the second flow of coolant through at least one other of said plurality of air-to-coolant heat exchangers dependent upon the mode of operation.

12. The vehicle heating and cooling system of claim 11, wherein said control module further controls said plurality of four-way valves.

13. The vehicle heating and cooling system of claim 12, wherein the first flow of coolant is heated within said first refrigerant-to-coolant heat exchanger and directed by said plurality of four-way valves through said outside heat exchanger for cooling the first flow of coolant, and the second flow of coolant is cooled within said second refrigerant-to-coolant heat exchanger and directed by said plurality of four-way valves through said second passenger compartment heat exchanger for lowering a temperature within the passenger compartment in a cooling mode of operation.

14. The vehicle heating and cooling system of claim 12, wherein the first flow of coolant is heated within said first refrigerant-to-coolant heat exchanger and directed by said plurality of four-way valves through said second passenger compartment heat exchanger for raising a temperature within the passenger compartment, and the second flow of coolant is cooled within said second refrigerant-to-coolant heat exchanger and directed by said plurality of four-way valves through said outside heat exchanger for warming the second flow of coolant in a heating mode of operation.

15. The vehicle heating and cooling system of claim 12, wherein the first flow of coolant is heated within said first refrigerant-to-coolant heat exchanger and directed by said plurality of four-way valves through said outside heat exchanger and said second passenger compartment heat exchanger for cooling the first flow of coolant and for warming the passenger compartment, and the second flow of coolant is cooled within said second refrigerant-to-coolant heat exchanger and directed by said plurality of four-way valves through said first passenger compartment heat exchanger for cooling the passenger compartment in a dehumidification and reheat mode of operation.

16. The vehicle heating and cooling system of claim 12, wherein the first flow of coolant is heated within said first refrigerant-to-coolant heat exchanger and directed by said plurality of four-way valves through an auxiliary coolant loop for heating a component or the second flow of coolant is cooled within said second refrigerant-to-coolant heat exchanger and directed by said plurality of four-way valves through said auxiliary coolant loop for cooling said component dependent upon the mode of operation.

17. The vehicle heating and cooling system of claim 9, wherein said coolant loop includes a plurality of reservoirs and manifolds for directing the first flow of coolant through at least one of said plurality of air-to-coolant heat exchangers and the second flow of coolant through at least one other of said plurality of air-to-coolant heat exchangers, dependent upon the mode of operation.

18. The vehicle heating and cooling system of claim 17, wherein the first flow of coolant is heated within said first refrigerant-to-coolant heat exchanger and directed by said plurality of reservoirs and manifolds through an auxiliary coolant loop for heating a component or the second flow of coolant is cooled within said second refrigerant-to-coolant heat exchanger and directed by said plurality of reservoirs and manifolds through said auxiliary coolant loop for cooling said component, dependent upon the mode of operation.

19. A method of heating and cooling a passenger compartment in a vehicle, comprising the steps of:
cycling a refrigerant through a refrigerant loop;
routing a first coolant flow through at least one of a plurality of air-to-coolant heat exchangers;
routing a second coolant flow through at least one other of said plurality of air-to-coolant heat exchangers; and
controlling said routing steps dependent upon a mode of operation.

20. The method of heating and cooling a passenger compartment in a vehicle of claim 19, further comprising the step of routing the first flow of coolant through a first manifold, an auxiliary coolant loop, and a first reservoir for heating a component or the second flow of coolant through a second manifold, said auxiliary coolant loop, and a second reservoir for cooling said component dependent upon the mode of operation.

\* \* \* \* \*